United States Patent
Meli et al.

(10) Patent No.: US 6,332,722 B1
(45) Date of Patent: Dec. 25, 2001

(54) METHOD FOR OPTICALLY CONNECTING OPTICAL COMPONENTS IN AN OPTOELECTRONIC RIG, AND OPTOELECTRONIC RIG CONSTRUCTED ACCORDING TO THIS METHOD

(75) Inventors: Fausto Meli, Piacenza; Gianfranco Mozzati, Pioltello, both of (IT)

(73) Assignee: Pirelli Cavi e Sistemi S.p.A., Milan (IT)

(*) Notice: Subject to any disclaimer, the term of this patent is extended or adjusted under 35 U.S.C. 154(b) by 0 days.

(21) Appl. No.: 09/126,947

(22) Filed: Jul. 31, 1998

Related U.S. Application Data
(60) Provisional application No. 60/062,694, filed on Oct. 23, 1997.

(30) Foreign Application Priority Data

Aug. 4, 1997 (EP) .................................. 97830410

(51) Int. Cl.⁷ .................................. G02B 6/255
(52) U.S. Cl. .................. 385/98; 385/97; 385/114
(58) Field of Search ................... 385/49, 98, 99, 385/96, 97, 114, 115; 65/407, 36, 42

(56) References Cited

U.S. PATENT DOCUMENTS

| | | |
|---|---|---|
| 4,812,010 | 3/1989 | Osaka et al. . |
| 4,830,646 | 5/1989 | Rossberg . |
| 5,115,338 | 5/1982 | DiGiovanni et al. . |
| 5,513,290 * | 4/1996 | Ishikawa et al. ...................... 385/49 |

FOREIGN PATENT DOCUMENTS

| | | |
|---|---|---|
| 0509577 | 10/1992 | (EP) . |
| 0595395 | 5/1994 | (EP) . |
| 0595396 | 5/1994 | (EP) . |

OTHER PUBLICATIONS

Patent Abstract of Japan–JP 08 327847, "Optical Amplifier Module," Abstract only, Dec. 1996.*

Patent Abstracts of Japan—JP 08 327847, "Optical Amplifier Module", Dec. 13, 1996, (Abstract Only).

Mitsuru Miyauchi et al., "Fully Automatic and High–Speed Splicing Machine for Optical Fiber Ribbons", The Transactions of the IEICE, vol. E72, No. 9, pp. 970–978, Sep. 1989.

Detlef Schade, "LWL–Netze Einfach Und Sicher Montieren", Elektronik, vol. 40, No. 20, pp. 139–142, Oct. 1, 1991.

Patent Abstracts of Japan—JP 63 118703, "Fusion Splicing Robot for Optical Fiber Cable", May 23, 1988, (Abstract Only).

* cited by examiner

Primary Examiner—Cassandra Spyrou
Assistant Examiner—Euncha Cherry
(74) Attorney, Agent, or Firm—Finnegan, Henderson, Farbow, Garrett & Dunner, L.L.P.

(57) ABSTRACT

For optically connecting according to a given connection diagram optical components in an optoelectronic rig, there is provision for the execution of a tape fusion bond between two series of end sections of fibers of the components, after having selected, ordered and prepared these sections in two series in a suitable manner, so as to establish—when fusion bonding is completed—the desired connections.

10 Claims, 7 Drawing Sheets

METHOD FOR OPTICALLY CONNECTING OPTICAL COMPONENTS IN AN OPTOELECTRONIC RIG, AND OPTOELECTRONIC RIG CONSTRUCTED ACCORDING TO THIS METHOD

Applicants claim the right of priority under 35 U.S.C. §119(a)–(d) based on patent application No. 97830410.3, filed Aug. 4, 1997, in the European Patent Office; additionally, Applicants claim the right of priority under 35 U.S.C. §119(e) based on prior-filed, copending provisional application No. 60/062,694, filed Oct. 23, 1997, in the U.S. Patent and Trademark Office.

BACKGROUND OF THE INVENTION

1. Field of the Invention

The present invention relates to the sector of optoelectronic rigs, and in particular to their internal architecture. It relates more particularly to a method for optically connecting in an optoelectronic rig, according to a given connection diagram, optical components comprising optical fibers having end sections for mutual connection, and to a rig constructed according to this method.

2. Related Background Art

Optoelectronic rigs are devices used to generate, analyze or modify luminous signals transmitted along a fiber optic line. Rigs of this type are for example optical amplifiers, optical pre-amplifiers, fiber lasers, optical spectrum analyzers, filters and optical switches made in planar optics, etc.

Known in particular are active-fiber optical amplifiers in which the amplifying element consists of a section of optical fiber doped with particular substances, typically rare earths. In this section of fiber, the luminous signal is amplified in optical form using luminous pumping energy provided by laser sources. On occasions the amplification is shared between two stages, and in this case the amplifier comprises two distinct sections of active optical fiber. Optical amplifiers with two stages are known for example from U.S. Pat. No. 5,115,338 and from European patent application EP-A-0509577.

The production of optoelectronic rigs, particularly amplifiers, is often complex.

For example, an active-fiber optical amplifier comprises many electrical, electro-optical and optical components. Among the optical components there are at least one active fiber, one or more optical couplers and possibly optical isolators. Among the electro-optical components there is at least one pumping laser and possibly one or more measurement diodes. The electrical components comprise power supply and control circuits. Locations must be found for all the components within the shell of the amplifier. The electrical components are normally installed on one or more cards, together with the electro-optical components. The layout of the electrical circuits presents no particular problems, and is effected in a manner similar to what occurs in any electrical rig, by means of circuits printed on the same cards or by means of leads soldered to appropriate terminals on the card.

However, because of the structural constraints imposed by the optical fibers, the installing of the optical components is more difficult: active components (active fiber) and passive components (isolators, couplers).

Thus, the optical fibers can be curved only up to a certain minimum radius of curvature, otherwise signal attenuations are produced or damage may even be done to the structure of the fiber. Furthermore, the links between different fibers are made with special rigs which effect an intimate link of the ends of the two fibers by butt fusion bonding, in such a way as to minimize the signal attenuations due to these links; each fusion bond thus effected is encapsulated in a cylindrical protective shell; this makes the fusion bonds akin—for the purposes of their locating in the shell of the amplifier—to passive optical components which likewise are generally of cylindrical shape. Finally, each optical or electro-optical component is provided with pig-tails for connection to the other components; these pig-tails have a certain length so as to allow repeat fusion bonding in the event of errors or repositionings (a component without a pig-tail or with too short a pig-tail can no longer be used) and the shell of the amplifier must therefore provide space to house these pig-tails.

Furthermore, the execution of the butt fusion bonds requires the use of special rigs near the shell of the amplifier. For this purpose also it is necessary that a sufficient length of pig-tail be available to reach this rig from the amplifier in the fitting phase.

The layout of the components inside the shell of an active-fiber optical amplifier has to take all these requirements into account.

Normally, housings are provided for one or more active-fiber spools as are means for partially winding the pig-tails (drums or similar elements); the installation of the remaining components then depends on the installation of the active fiber and of the pig-tails. Often, the various passive components and the fusion bonds are laid out in the shell in a rather disordered manner, and fitting is therefore particularly complex; furthermore, the fixing of the components may prove to be unsure because achieved for example using clips and/or silicone glue.

European patent applications No. EP-A-0595395 and No. EP-A-0595396 describe active-fiber optical amplifiers in which care has been taken over the layout of the components so as to minimize the size of the amplifier, in order to ease its insertion into bays or cabinets. In such amplifiers special seats are provided for the active and passive optical components, for the electro-optical components and for the fusion bonds. The seats are variously laid out inside the shell of the amplifier.

A particular problem is with the fusion bonds between fibers, which are often present in large numbers in the optoelectronic rig (see for example the case of active-fiber amplifiers). Their production and ordered layout inside the rig are often the most difficult phases of the production of the rig.

SUMMARY OF THE INVENTION

In its first aspect, therefore, the present invention relates to a method for optically connecting in an optoelectronic rig, according to a given connection diagram, optical components comprising optical fibers having end sections for mutual connection, characterized in that it comprises the phases of:

selecting at least some of the optical components to be connected together;

subdividing the selected optical components into a first and a second group, in such a way that each optical component is placed in a different group from the optical components which are to be connected directly to it according to the given diagram;

ordering the end sections of the components in the first and second groups in such a way as to form respectively a first and a second series of end sections, the ordering being such that for each pair of end sections to be connected together the end sections occupy the same position in the respective series;

bringing abreast the ordered end sections in each series, under conditions of substantial coplanarity and parallelism;

preparing and cutting the brought-abreast end sections in tape form;

positioning the two series of end sections in such a way as to abut the end sections of one series with the end sections of the other series in a corresponding manner;

executing a tape fusion bond between the two series of end sections.

The phrase "end section of an optical fiber" is intended here and in the sequel of the present patent text to mean a terminal section of the optical fiber, having sufficient length to be manipulated with ease, without this entailing risks of damaging the fiber on account of the curvatures imparted.

The expression "tape fusion bonding" is intended to indicate collective fusion bonding carried out on two or more fibers simultaneously, forming a tape or band of line-abreast fusion bonds. Such fusion bonding can be done with a so-called tape fusion bonder (also referred to as a ribbon fusion bonder), a rig known per se, such as for example the model 2ORS II 12 fusion bonder from the Fujikura company.

The method indicated above substantially simplifies the construction of even very complex optoelectronic rigs having a large number of optical components to be linked and hence a large number of optical fibers to be fusion bonded together. Furthermore, the layout of the components and of the optical fibers inside the optoelectronic rig is more ordered, facilitating any operations of handling and replacing defective components. It also facilitates the recovery of still usable components from faulty rigs which can no longer be repaired, as a complex optoelectronic rig comprises components having different lifetimes, and normally when the optoelectronic rig is regarded as no longer repairable there are nevertheless components therein which are still perfectly functional, which may advantageously be recovered for reuse in other rigs.

According to an alternative embodiment, the present invention relates to a method for optically connecting in an optoelectronic rig, according to a given connection diagram, optical components comprising optical fibers having end sections for mutual connection, characterized in that it comprises the phases of:

selecting at least some of the optical components to be connected together;

ordering the end sections of the selected components in a main series;

preparing a plurality of auxiliary optical fibers, equal in number to half of the end sections in the main series;

ordering the end sections of the auxiliary optical fibers in an auxiliary series, in such a way that in the auxiliary series the two end sections of any one auxiliary optical fiber lie in positions corresponding to two end sections of the main series which are to be connected together;

bringing abreast the end sections in each series, under conditions of substantial coplanarity and parallelism;

preparing and cutting the brought-abreast end sections in tape form;

positioning the auxiliary series in such a way as to abut the end sections thereof with the end sections of the main series in a corresponding manner;

executing a tape fusion bond between the main series and the auxiliary series.

As compared to the first embodiment indicated above, this second embodiment is adapted to any connection diagram, even one with loop structures of any type. The first embodiment, however, allows the realization of connection diagrams with loop structures only if the loop structures have an even number of components because if the number of components of a loop structure is odd, it is not possible to select all the components of this structure since it would be impossible to divide them into two groups. To explain this limitation, consider for example a triangular loop structure, with three components X, Y and Z to be connected together; putting X into the first group, Y and Z would both have to be put into the second group (since they are both intended for connection to X), but in this way the second group would contain two components (Y and Z specifically) which are to be connected together.

On the other hand, the first embodiment, under the same conditions, requires half the number of fusion bonds; hence, the first embodiment is in general preferable, especially where attenuations of the luminous signal must be reduced to the minimum, since each fusion bond causes attenuation, more or less considerable depending on the case, in the signal which passes across it. Furthermore, with the first embodiment, the size is substantially smaller.

The two embodiments can coexist in the same rig, in the sense that some optical components can be connected together in accordance with the first embodiment, and others in accordance with the second. Such a mixed solution seems of interest especially in the case in which the connection diagram provides for a high number of components and includes loop structures with an odd number of components. In such a case, the second embodiment, with one or more auxiliary optical fibers, may be followed for one or more pairs of connections between the components included in the loop structure, whereas the first embodiment may advantageously be used for the other optical components so as to minimize the fusion bonds and reduce the dimensions.

Preferably, the phase of bringing abreast comprises a phase of pre-fixing the end sections, and a phase of fixing by distributing thereon a resin which hardens in air, preferably an acrylic resin, for example the resin known by the abbreviation FAA 02 produced by the Fujikura company.

Preferably, the phase of pre-fixing comprises a bathing of the end sections with the resin in the liquid state, in such a way as to obtain mutual adhesion by cohesion. This simple expedient, by virtue of the action of molecular cohesion, makes it possible easily to keep the end sections of the fibers to be fusion bonded in the correct position for a certain time, sufficient to prepare a firmer fixing. As an alternative to bathing, the phase of pre-fixing comprises a mechanical locking of the end sections in a support.

The diameters of the end sections of fiber which are connected together do not necessarily have to be equal. Nevertheless, preferably each end section of fiber has a diameter approximately equal to the diameter of the end section of fiber to which it is to be connected; in this way it has been verified that the attenuations of the luminous signal which passes across the fusion bond are indeed reduced to the minimum. Still more preferably, all the end sections of the fibers of the selected components are of approximately equal diameter.

In its second aspect, the invention relates to an optoelectronic rig which includes a plurality of optical components comprising optical fibers having end sections connected together, characterized in that it comprises tape fusion bonding wherein is effected the optical connection between the end sections of at least some of the optical components.

Such a rig can be obtained with the method indicated above, in its first or in its second embodiment.

BRIEF DESCRIPTION OF THE DRAWING

Further characteristics and advantages of the invention will become clear from the following detailed description of an optoelectronic rig and of the method according to which it is constructed, in accordance with the invention. The description makes reference to the appended figures in which.

DETAILED DESCRIPTION OF THE INVENTION

Figure 1:
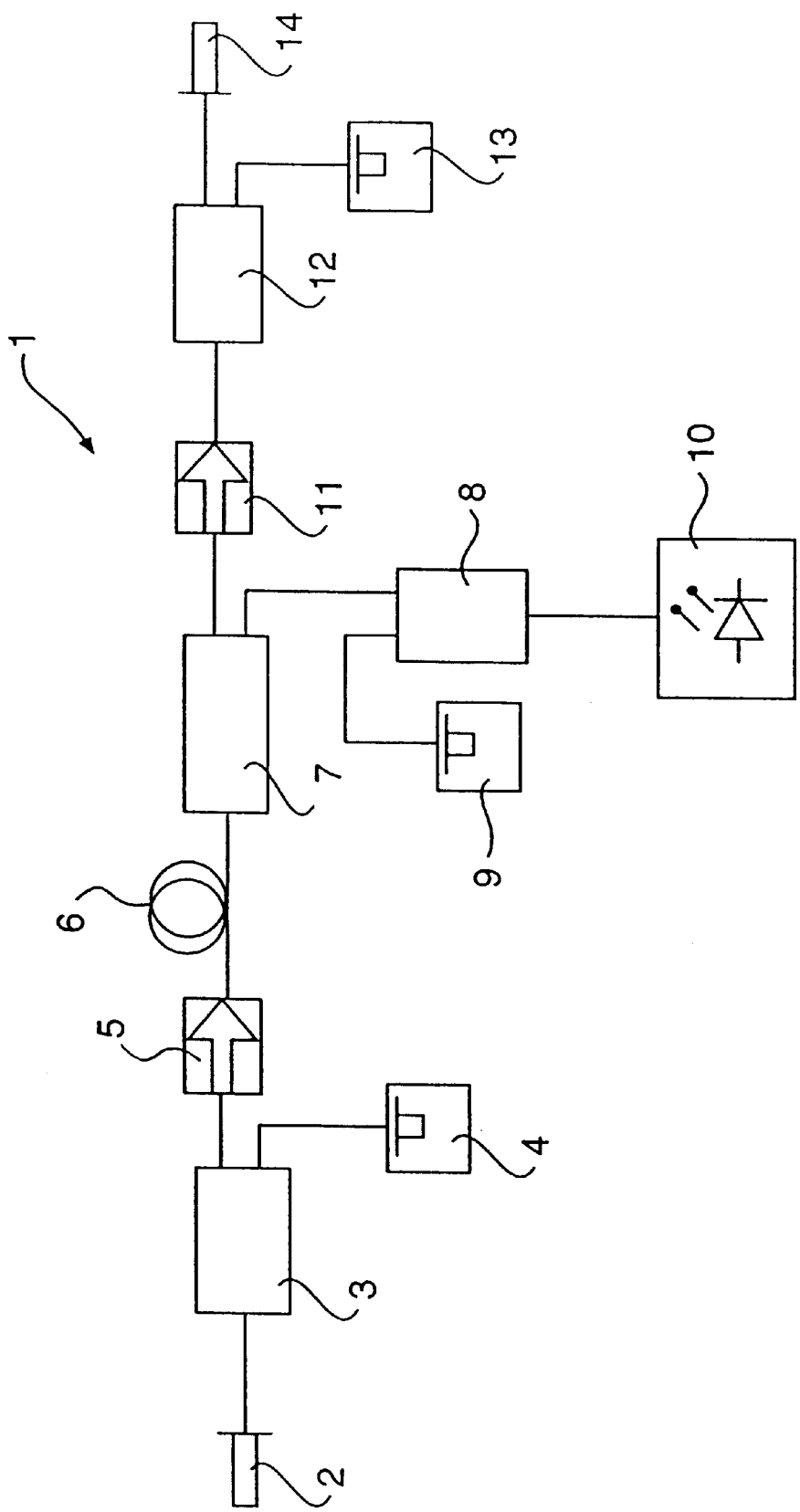
FIG. 1 is an optical circuit diagram of an optoelectronic rig, in particular an active-fiber optical amplifier.

In the figures, 1 indicates overall an optoelectronic rig, in particular an active-fiber optical amplifier. The amplifier 1 comprises, laid out in the manner indicated in FIG. 1, the following components: a first connector 2, a first splitter 3, a first photodiode 4, a first isolator 5, an active fiber 6, a coupler 7, a second splitter 8, a second photodiode 9, a pumping laser 10, a second isolator 11, a third splitter 12, a third photodiode 13 and a second connector 14. It is stressed that the amplifier 1 is just one of the multifarious examples of optoelectronic rigs to which the invention can be applied.

All the abovementioned optical components 2–14 are provided with optical fibers having respective end sections for mutual connection of the components 2–14, according to a given connection diagram.

Some optical components have a single end section of optical connection fiber: the connectors 2 and 14, the photodiodes 4, 9 and 13 and the pumping laser 10.

Some optical components have two end sections of optical connection fiber: the isolators 5 and 11 and the active fiber 6.

Some optical components have three end sections of optical connection fiber: the splitters 3, 8 and 12 and the coupler 7.

The end sections, to aid the understanding of the description, are all indicated with the letter T, followed by a double reference consisting of two numbers separated by an oblique, "/": the first number indicates the optical component with which the section is initially associated, the second the optical component to which the section is to be connected. Therefore, for example, the section indicated as T7/8 is that associated with the coupler 7 and intended to be optically connected to a section (indicated as T8/7) associated with the second splitter 8.

In the construction of the rig 1, all the end sections of the optical connection fibers of the various components are to be optically connected together, according to the given connection diagram for the specific optoelectronic rig.

Figure 2:
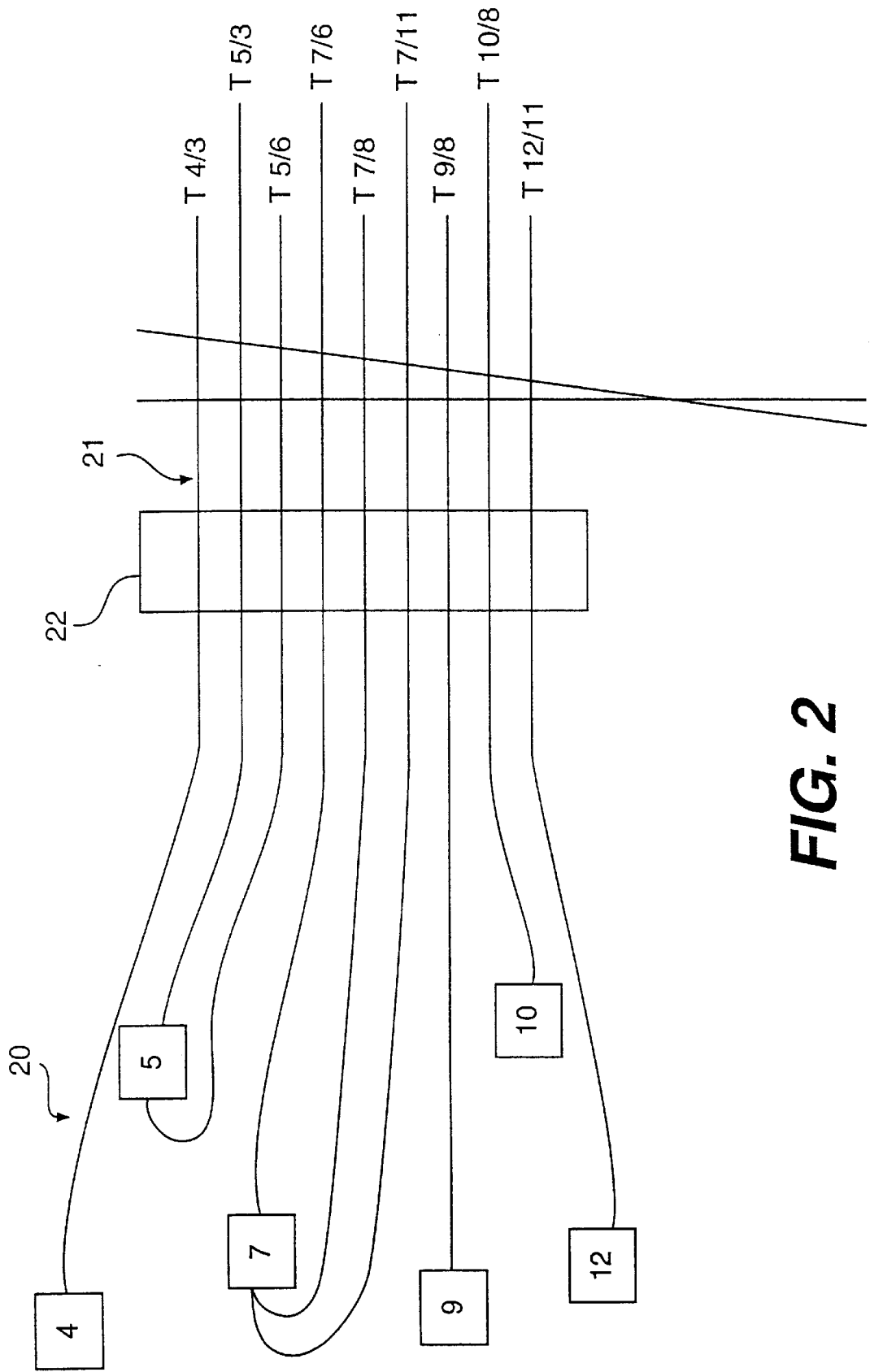
FIGS. 2, 3 and 4 show successive operational phases for constructing the rig of FIG. 1, in accordance with a first embodiment of the invention.
Figure 3:
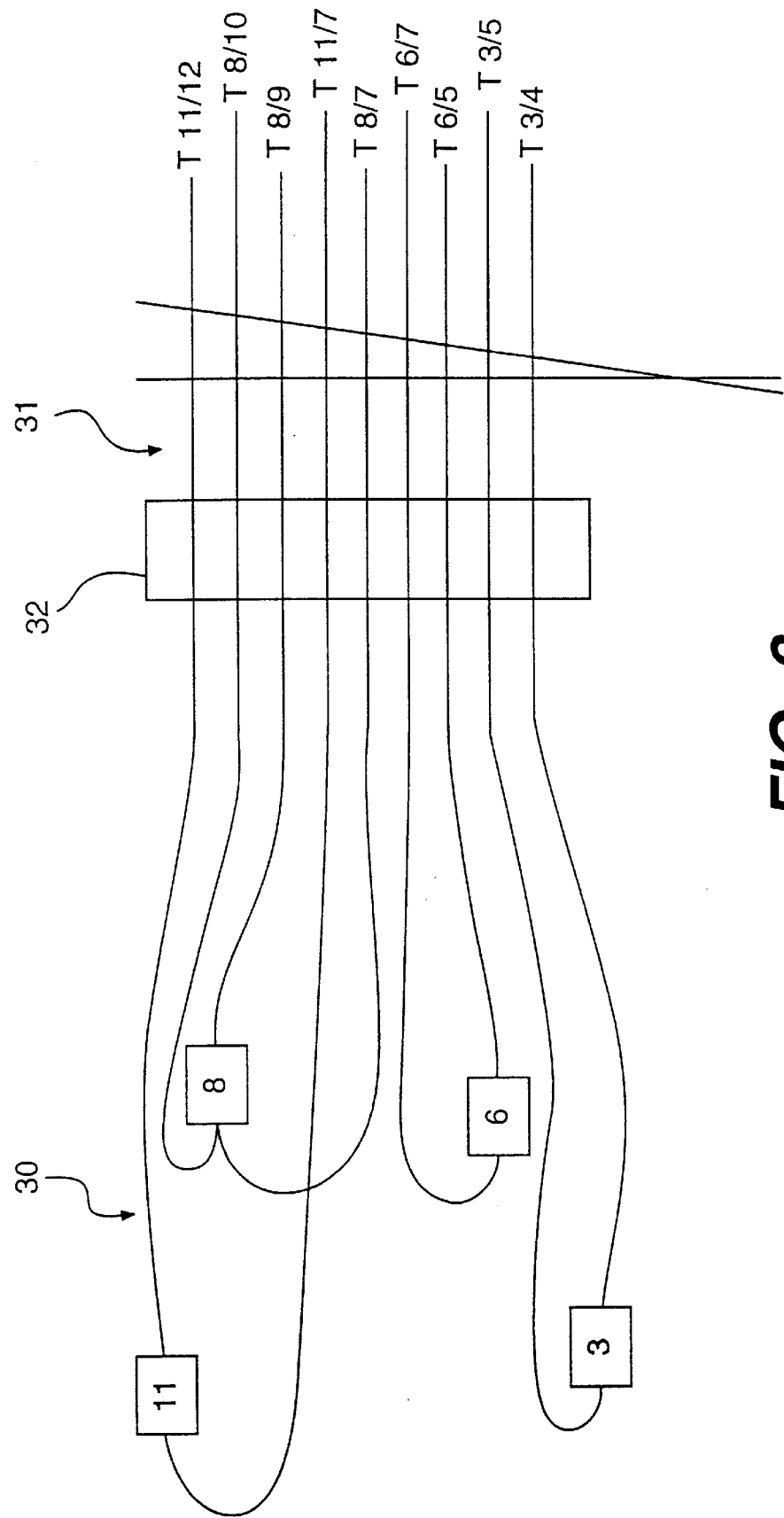
Figure 4:
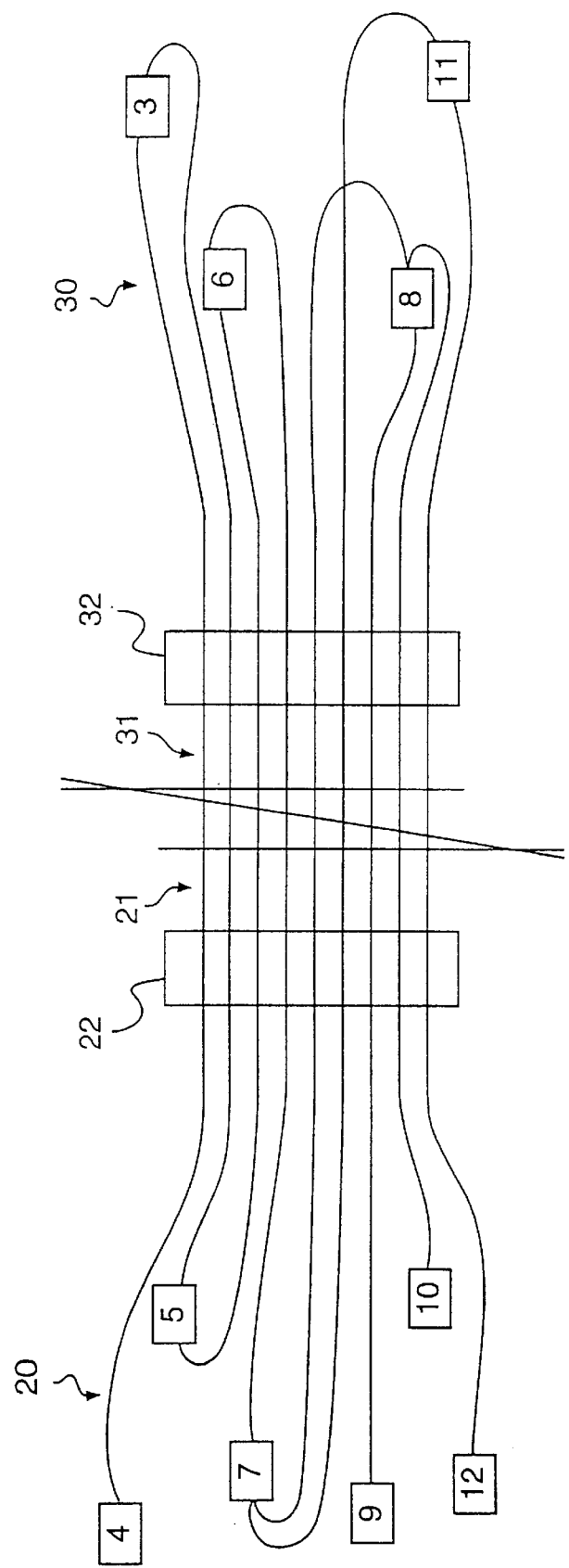

In accordance with the first embodiment of the method of the invention, the connections are made in the manner described hereafter, with reference to FIGS. 2–4.

Firstly, the components 2–14 in respect of which it is desired to operate in accordance with the invention are selected. In the example illustrated, the selected components are the components 3–12, i.e. the components 2, 13 and 14 are not selected.

This selection is effected in the manner indicated only to show the meaning of the selection phase, and does not reflect any particular technological requirement of the amplifier 1. In actual specific cases it may be preferred to select all the components so as to make all the connections between them according to the invention, or to select only some of them if there are technical grounds for preferring the use of different connection techniques in respect of the other components. Thus, in the case in which there are non-selected components, such as the components 2, 13 and 14, the connections relating to these are made by different techniques, for example by conventional butt fusion bonding, or even according to the second embodiment of the invention.

Subsequently, the selected components 3–12 are subdivided into a first group 20 and into a second group 30, in such a way that each selected optical component is placed in a different group from the optical components which are to be connected directly to it according to the given diagram. In particular, according to the example shown, the following components are placed in the first group 20: the first photodiode 4, the first isolator 5, the coupler 7, the second photodiode 9, the pumping laser 10 and the third splitter 12. In the second group 30 are placed, on the other hand, the first splitter 3, the active fiber 6, the second splitter 8 and the second isolator 11.

In the next phase, the end sections of the components of each group 20 and 30 are ordered, thereby creating two series 21 and 31 of corresponding end sections. The ordering is such that, for each pair of end sections to be connected together, the end sections in the respective series 21 or 31 occupy the same position. In the example illustrated, the series 21 comprises in order the following nine end sections T4/3, T5/3, T5/6, T7/6, T7/8, T7/11, T9/8, T10/8, T12/11. The series 31 comprises, on the other hand, in order the following nine end sections: T3/4, T3/5, T6/5, T6/7, T8/7, T11/7, T8/9, T8/10, T11/12.

Next, a phase is undertaken in which, in each of the two series 21 and 31, the end sections are brought abreast, in a condition of substantial coplanarity and parallelism. In practice, a flat bundle or ribbon with their respective end sections is formed for each series 21 or 31. To ease this operation, a pre-fixing of the end sections is preferably performed first, by bathing them in a resin in the liquid state which hardens in air (preferably an acrylic resin, for example the resin known as FAA 02 produced by the Fujikura company) in such a way as to facilitate their bringing abreast by virtue of the forces of molecular cohesion between the fibers created by surface tension. The resin is distributed with the help of a mop of the type used for fiber cleaning, soaked in the liquid resin. Next, the end sections are fixed firmly together by the hardening of the resin.

Alternatively, the pre-fixing may be achieved mechanically with appropriate supports provided with clamps 22 and 32, where the end sections are held in the straight position, so as to allow distributing and hardening of the resin. It is suitable for the excess fiber for each end section inserted into the clamp to be around 25–30 mm; smaller lengths could make cutting difficult (see later), greater lengths would create unnecessary wastage of fiber.

In the next phase the stripping of the ribbons, i.e. the removal of the acrylic protective layers from the optical fibers is undertaken. This phase can advantageously be executed with a hot stripping rig, such as for example that known as a "Hot Jacket Stripper HJS-01" from the Fujikura company. Each ribbon locked in the respective clamp is inserted into the rig, and after the necessary heating time the stripping is undertaken by means of traction on the clamp. It may be necessary to repeat this operation to ensure that the removal of the acrylic jacket is complete.

If necessary, the removal of the final residues may be carried out manually, with the assistance of a cotton-clad swab soaked in ethyl alcohol R-P. It is necessary to check that at the end of the aforesaid operations the ribbon remains intact, i.e. the fibers are still joined together, otherwise the subsequent cutting may be defective. If the ribbon is no longer intact, it has to be reformed, again with the assistance of a mop soaked in FAA 02.

At this point it is possible to undertake the cutting, using a ribbon cutter, for example the rig known as a "CT 107" from the Fujikura company. The ribbon, held in the respective clamp, is inserted into the cutter; all the fibers of the ribbon are cut together by the action of the blade of the cutter. Cutting takes place perpendicularly to the axis of each of the fibers of the ribbon.

Finally the fusion bonding is undertaken, using a ribbon fusion bonder, for example the rig known as "2ORS II 12" from the Fujikura company. The ribbon of the first series 21 of end sections, still locked in the respective clamp, is inserted into one side of the fusion bonder, whilst the ribbon of the second series 31, likewise locked in the respective clamp, is inserted into the other side of the fusion bonder. To avoid fiber abutment errors due to errors of perpendicularity in the cut, attention should be paid to the orientation of the two ribbons: one of the two should be inverted with respect to the other, in such a way that any inclination of the cuts corresponds and is compensated for.

The following correspondences and consequent connections are then made between the two series 21 and 31:

end sections T4/3 and T3/4 for the connection between the first photodiode 4 and the first splitter 3;

end sections T5/3 and T3/5 for the connection between the first isolator 5 and the first splitter 3;

end sections T5/6 and T6/5 for the connection between the first isolator 5 and the active fiber 6;

end sections T7/6 and T6/7 for the connection between the coupler 7 and the active fiber 6;

end sections T7/8 and T8/7 for the connection between the coupler 7 and the second splitter 8;

end sections T7/11 and T11/7 for the connection between the coupler 7 and the second isolator 11;

end sections T9/8 and T8/9 for the connection between the second photodiode 9 and the second splitter 8;

end sections T10/8 and T8/10 for the connection between the pumping laser 10 and the second splitter 8;

end sections T12/11 and T11/12 for the connection between the third splitter 12 and the second isolator 11.

Note that the abovementioned fusion bonder performs a check of the feasibility of the fusion bonding before executing it.

The check may result in a "bad cut" message; in this case the cut should be repeated, otherwise a good fusion bond will not be possible.

Alternatively, the check may give a "wrong alignment" message. Manifestly, it is possible to adjust the alignment of the two ribbons by acting on means of adjustment provided on the fusion bonder. Nevertheless it has been found that under these conditions the fusion bond leads to high values of attenuation in respect of the signals which cross the fusion bond, outside of the normal tolerance limits. It is then necessary to extract the ribbons from the fusion bonder and thoroughly clean the supports of the fusion bonder before repositioning the ribbons.

If everything is in place, the fusion bonder gives an "OK" message, thereby signaling that it is possible to undertake fusion bonding.

Figure 5:
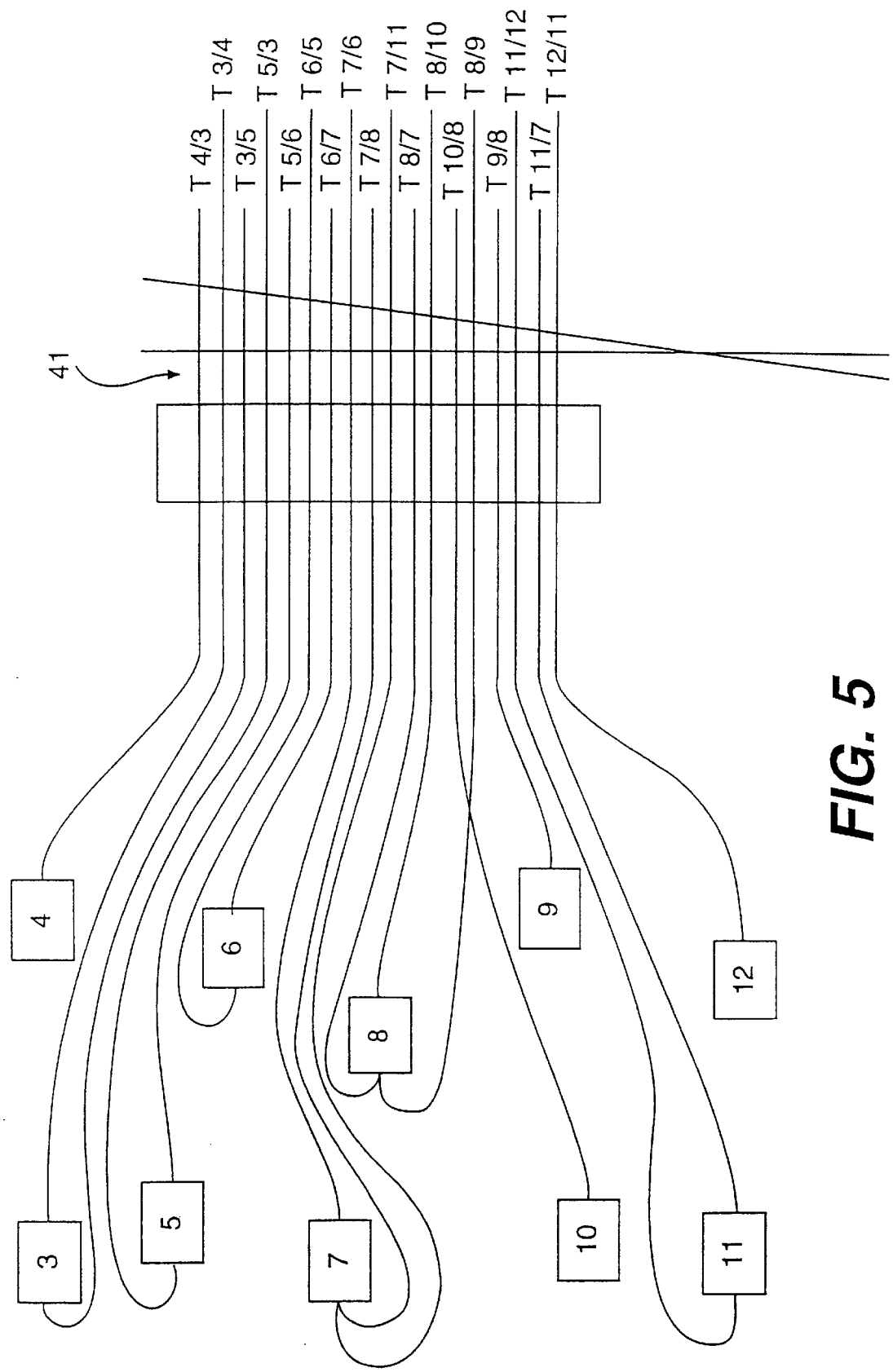
FIGS. 5, 6 and 7 show successive operational phases for constructing the rig of FIG. 1, in accordance with a second embodiment of the invention.
Figure 6:
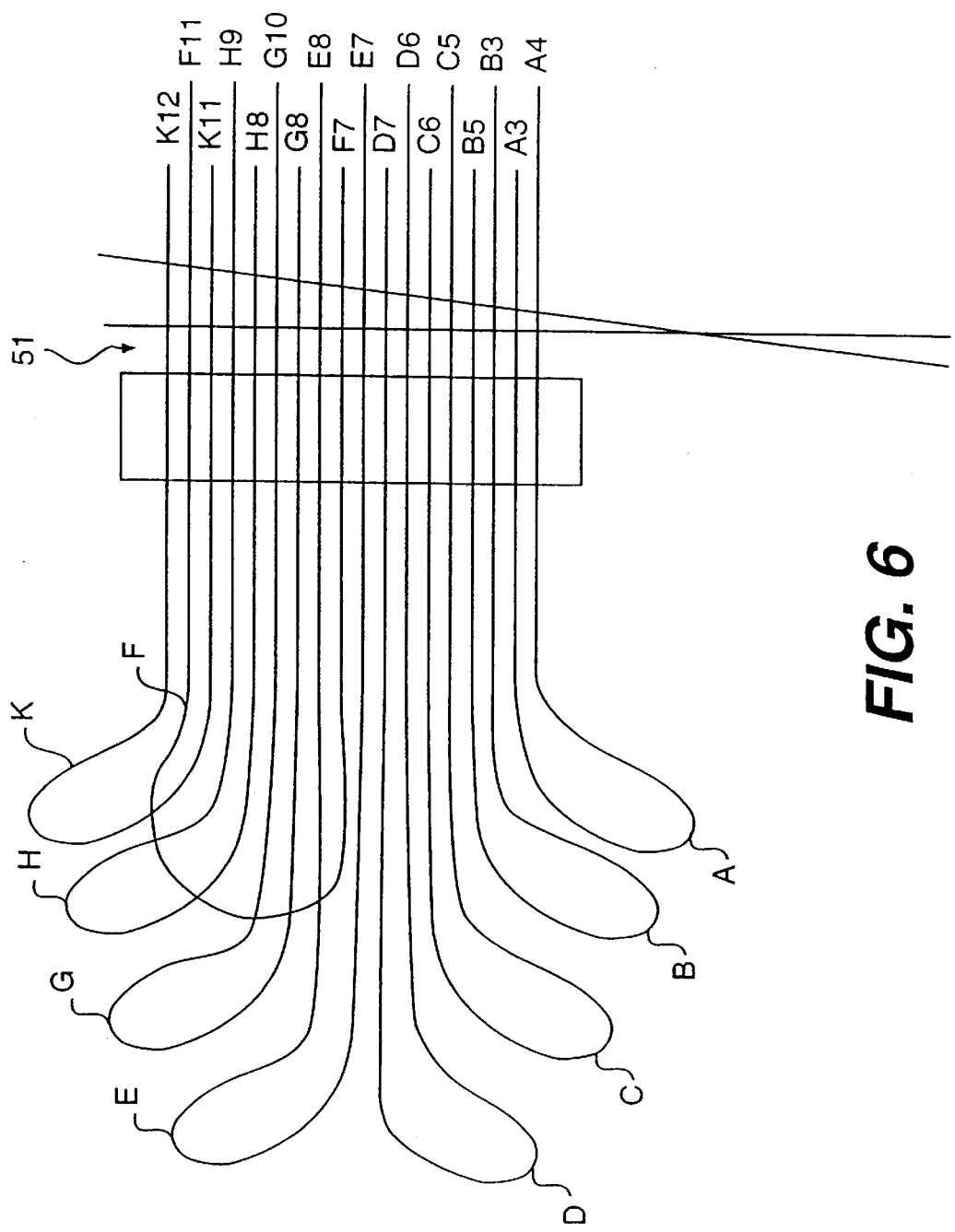
Figure 7:
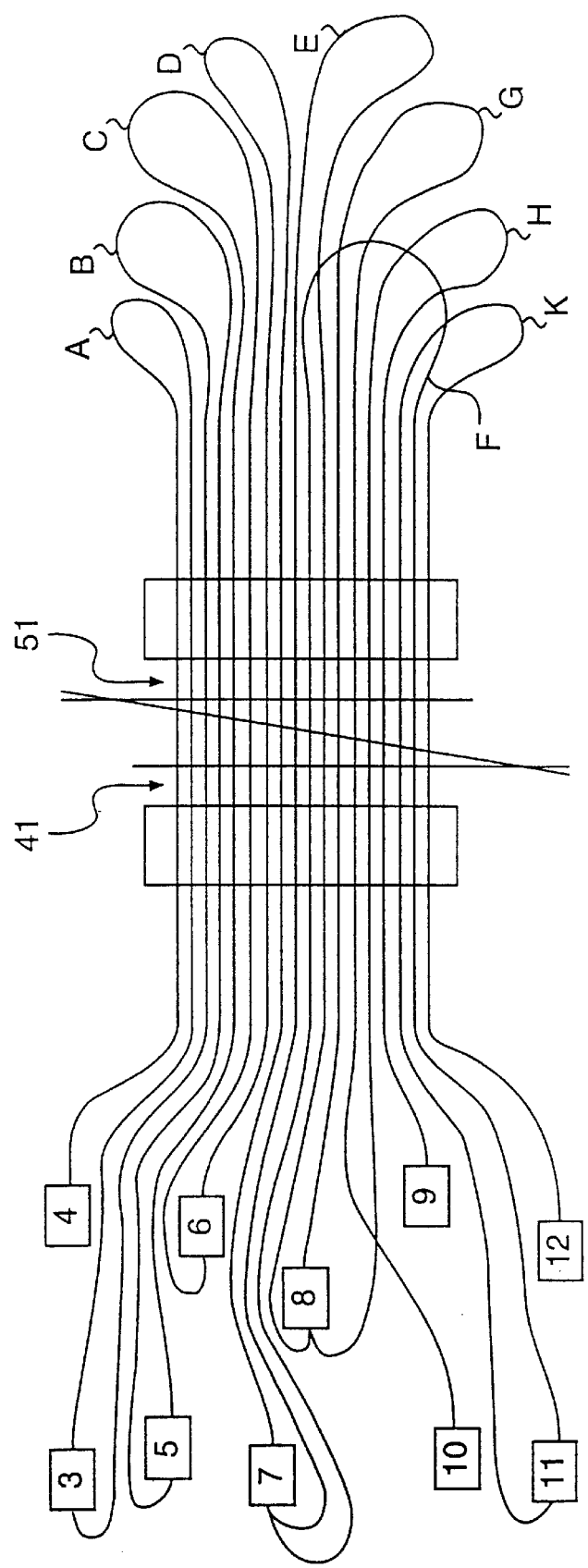

As an alternative to the first embodiment of the invention, in accordance with the second embodiment of the method of the invention, the connections in respect of the optical amplifier 1 are performed in the manner described hereafter, with reference to FIGS. 5–7.

In this case also, the first phase provides for the selection of the components 2–14 in respect of which it is desired to operate in accordance with the invention. To allow a better comparison of the two embodiments, in the example illustrated in FIGS. 5–7 the same optical components as were selected to illustrate the first embodiment have been selected, i.e. components 3–12.

Next, the end sections of the optical fibers of the selected components are ordered in a single main series 41.

In the example illustrated, the series 41 comprises in order the following 18 end sections: T4/3, T3/4, T3/5, T5/3, T5/6, T6/5, T6/7, T7/6, T7/8, T7/11, T8/7, T8/10, T10/8, T8/9, T9/8, T11/12, T11/7, T12/11.

At this point auxiliary optical fibers are prepared, equal in number to half of the end sections of the main series 41; therefore, in the case exemplified, there are nine prepared auxiliary optical fibers, indicated with the reference letters A, B, C, D, E, F, G, H, K. It should be noted here that the end sections of the series 41 cannot be odd in number but are necessarily even in number, since for each fiber associated with a specified optical component and intended for connection with another optical component there is correspondingly a fiber associated with this further component and intended for connection with the first component.

Each of the auxiliary optical fibers A–H, K comprises two respective end sections, which are indicated by a letter identical to the reference letter of the auxiliary fiber of which they form part, followed by a number identical to the number of the component to which it is to be connected. Therefore, for example, the section G8 is that belonging to the auxiliary fiber G and intended to be optically connected to the second splitter 8.

The ordering of the end sections of the auxiliary fibers A–H, K in an auxiliary series 51 is then undertaken. The ordering of the auxiliary series 51 is such that in the auxiliary series 51 the two end sections of any one auxiliary optical fiber lie in positions corresponding to end sections of the main series 41 which are to be connected together. In the example illustrated, the auxiliary series 51 therefore comprises, in order, the following sections: A4, A3, B3, B5, C5, C6, D6, D7, E7, F7, E8, G8, G10, H8, H9, K11, F11, K12.

At this point, the series 41 and 51 are dealt with in a manner entirely analogous to that provided for with the series 21 and 31 for the first embodiment of the method of the invention. Without repeating all the phases in detail, the forming of the ribbons is thus undertaken by the bringing abreast of the end sections of each series, stripping them, cutting and fusion bonding. In bringing the two ribbons alongside for fusion bonding, on account of the ordering of the two series 41 and 51, the following connections are established:

end sections T4/3, A4, A3 and T3/4 for the connection between the first photodiode 4 and the first splitter 3;

end sections T3/5, B3, B5 and T5/3 for the connection between the first splitter 3 and the first isolator 5;

end sections T5/6, C5, C6 and T6/5 for the connection between the first isolator 5 and the active fiber 6;

end sections T6/7, D6, D7 and T7/6 for the connection between the active fiber 6 and the coupler 7;

end sections T7/8, E7, E8 and T8/7 for the connection between the coupler 7 and the second splitter 8;

end sections T7/11, F7, F11 and T11/7 for the connection between the coupler 7 and the second isolator 11;

end sections T8/10, G8, G10 and T10/8 for the connection between the second splitter 8 and the pumping laser 10;

end sections T8/9, H8, H9 and T9/8 for the connection between the second splitter 8 and the second photodiode 9;

end sections T11/12, K11, K12 and T12/11 for the connection between the second isolator 11 and the third splitter 12.

It should be observed that with the second embodiment of the method of the invention, the construction of the same rig (the optical amplifier 1), or rather the linking of the same optical components, requires double the number of links because whereas with the first embodiment one link is executed, with the second embodiment two are executed.

Therefore, for equal quality of links constructed, the attenuation introduced into each section of the rig is doubled. Hence, the first embodiment is normally preferable; nevertheless, the second embodiment is of interest in the case in which the fusion bonding allows particularly low values of attenuation to be obtained, or when the value of attenuation introduced is not of prime interest.

On the other hand, with the second embodiment an appreciable rationality of layout is obtained, which in some cases may make this embodiment preferable. Furthermore, as already explained, the second embodiment does not have constraints in respect of the construction of looped optical circuits of any type, whilst with the first embodiment it is not possible to include all the components inserted in loop structures with an odd number of components.

In both cases the invention makes it possible to simplify the operations of constructing the optoelectronic rig.

In particular, according to the first implementation, it is possible separately to construct a first rack with all the optical components of the first group and a second rack with all the optical components of the second group. No fusion bonding is carried out in either of the two racks, rather all the end sections of the optical fibers of the components are simply gathered into respective ordered flat bundles. Next, the tape fusion bonding between the two flat bundles is executed, connecting together in the manner provided the optical components distributed between the two racks.

According to the second embodiment, by contrast, it is possible to prepare a main rack with all the optical components, without any fusion bonding therein, with all the end sections of the optical fibers of the components gathered abreast as a single flat bundle. Separately an auxiliary rack is prepared with the auxiliary optical fibers, this likewise having all the end sections gathered abreast as a single flat bundle. Finally, the tape fusion bonding is executed.

In both cases, this procedure is advantageous since it makes it possible to use three different operators: while two are working independently on the two different racks, a third connects two previously prepared racks. Construction times can therefore be appreciably reduced.

Again, an optoelectronic rig constructed in accordance with the invention allows easy handling, by virtue of the rational and simple layout of the components. In particular, it becomes easy to get at a faulty component for replacement thereof; naturally, in the event of replacement of individual components, these will be inserted into the optical circuit of the rig by conventional butt fusion bonding. Recovery of reusable components from a faulty rig which can no longer be repaired is then made particularly easy.

What is claimed is:

1. A method for optically connecting optical components in an optoelectronic rig, comprising the steps of:

selecting at least two optical components to be connected together, wherein the at least two optical components each comprises optical fibers including at least one end section for connection to at least one other optical component;

ordering the end sections of the selected optical components in a main series;

preparing a plurality of auxiliary optical fibers equal in number to half of the number of end sections in the main series, wherein each auxiliary optical fiber includes two end sections;

ordering the end sections of the auxiliary optical fibers in an auxiliary series, so that the two end sections of each auxiliary optical fiber in the auxiliary series lie in positions corresponding to two end sections of the main series which are to be connected together;

bringing abreast the end sections in the main series, under conditions of substantial coplanarity and parallelism;

bringing abreast the end sections in the auxiliary series, under conditions of substantial coplanarity and parallelism;

preparing and cutting the brought-abreast end sections in tape form;

positioning the auxiliary series to abut the end sections thereof with the end sections of the main series in a corresponding manner; and executing a tape fusion bond between the end sections of the main series and the end sections of the auxiliary series.

2. The method of claim 1, in which the bringing abreast steps comprise a step of pre-fixing the end sections, and a step of fixing by distributing thereon resin which hardens in air.

3. The method of claim 2, in which the pre-fixing step comprises bathing the end sections with resin in a liquid state to obtain mutual adhesion by cohesion.

4. The method of claim 2, in which the pre-fixing step comprises a mechanical locking of the end sections in a support.

5. The method of claim 1, in which at least one of the steps of bringing abreast, preparing and cutting, positioning, and executing a tape fusion bond uses a tape fusion bonding rig.

6. The method of claim 1, in which the preparing and cutting step includes stripping the end sections.

7. The method of claim 1, in which the cutting is performed in a direction substantially perpendicular to an optical axis of the optical fibers.

8. The method of claim 1, in which each end section of optical fiber has a diameter approximately equal to a diameter of the end section of optical fiber to which it is to be connected.

9. The method of claim 8, in which all the end sections of the optical fibers of the selected optical components are of approximately equal diameter.

10. An optoelectronic rig comprising optical components optically connected according to the method of claim 1.

* * * * *